(12) United States Patent
García Bort et al.

(10) Patent No.: US 9,762,852 B2
(45) Date of Patent: Sep. 12, 2017

(54) MULTI-CHANNEL VIDEO INTERCOM SYSTEMS WITH ACCESS TO ADVANCED DIGITAL SERVICES

(71) Applicant: FERMAX DESIGN & DEVELOPMENT, S.L.U., Valencia (ES)

(72) Inventors: José Ignacio García Bort, Valencia (ES); Jesus Molina Hernandez, Valencia (ES); Elias García García, Valencia (ES); Alberto Alegre Cubel, Valencia (ES); Carlos Ferrer Zaera, Valencia (ES)

(73) Assignee: FERMAX DESIGN & DEVELOPMENT, S.L.U., Valencia (ES)

( * ) Notice: Subject to any disclaimer, the term of this patent is extended or adjusted under 35 U.S.C. 154(b) by 0 days.

(21) Appl. No.: 14/974,632

(22) Filed: Dec. 18, 2015

(65) Prior Publication Data
US 2016/0381321 A1    Dec. 29, 2016

(51) Int. Cl.
*H04N 7/14* (2006.01)
*H04M 11/02* (2006.01)
(Continued)

(52) U.S. Cl.
CPC ........... *H04N 7/147* (2013.01); *H04B 3/50* (2013.01); *H04L 12/2834* (2013.01);
(Continued)

(58) Field of Classification Search
None
See application file for complete search history.

(56) References Cited

U.S. PATENT DOCUMENTS

2005/0285934 A1* 12/2005 Carter ............... H04N 7/147
                                                         348/14.06
2008/0279202 A1    11/2008 Choi et al.
(Continued)

FOREIGN PATENT DOCUMENTS

CN    201215979 Y    4/2009
CN    101977192 A    2/2011
(Continued)

*Primary Examiner* — Maria El-Zoobi
(74) *Attorney, Agent, or Firm* — Avery N. Goldstein; Blue Filament Law PLLC

(57) ABSTRACT

A multi-channel video intercom system with access to advanced digital services includes a two-wire communication bus for audio, video, and data communications in different communication channels, at least one outdoor panel having a camera connected to the communication bus, at least one power supply connected to the communication bus to provide power to the rest of the video intercom system, at least one user terminal connected to the communication bus wherein at least one terminal is connected to the at least one outdoor panel, and wherein at least one terminal is a video intercom terminal. The system further includes a communications gateway connected to the communication bus through a first connection interface and Internet connected through a second connection interface wherein the gateway is allowed access to advanced digital services via the Internet from at least one video intercom terminal through at least one communication bus channel available for data.

13 Claims, 2 Drawing Sheets

(51) Int. Cl.
    *H04B 3/50*         (2006.01)
    *H04N 7/18*         (2006.01)
    *H04L 12/64*        (2006.01)
    *H04L 12/28*        (2006.01)
    *H04M 3/42*        (2006.01)

(52) U.S. Cl.
    CPC ...... H04L 12/2838 (2013.01); H04L 12/6418 (2013.01); H04M 3/42357 (2013.01); H04M 11/025 (2013.01); H04N 7/186 (2013.01); *H04L 2012/2849* (2013.01)

(56) References Cited

U.S. PATENT DOCUMENTS

| | | | |
|---|---|---|---|
| 2009/0237487 A1* | 9/2009 | Santini | H04L 12/282 348/14.01 |
| 2011/0299541 A1* | 12/2011 | Diab | G06Q 20/10 370/401 |
| 2012/0028589 A1 | 2/2012 | Fan et al. | |
| 2013/0297259 A1 | 11/2013 | Tsao et al. | |
| 2015/0009283 A1 | 1/2015 | Ferrer Zaera et al. | |

FOREIGN PATENT DOCUMENTS

| | | |
|---|---|---|
| EP | 2824917 A1 | 1/2015 |
| ES | 2170682 B1 | 8/2002 |
| WO | 2007060014 A1 | 5/2007 |
| WO | 2011124441 A1 | 10/2011 |
| WO | 2012066397 A1 | 5/2012 |

\* cited by examiner

MULTI-CHANNEL VIDEO INTERCOM SYSTEMS WITH ACCESS TO ADVANCED DIGITAL SERVICES

FIELD OF THE INVENTION

The present invention relates in general to communication systems. In particular, the invention relates to a multi-channel video intercom system implemented by hardware elements and software adapted to facilitate access to advanced digital services in dwellings, offices or similar, wherein said services are provided from outside the dwellings, creating an intelligent building system.

BACKGROUND OF THE INVENTION

The access of the end users to information technologies and to the digital services that these provide is conditioned by various factors and problems.

One of the problems is the geographical location of the users, as it can condition the availability of said digital services, depending on the telecommunications deployment in each area. For example, not all inhabited areas have a communication network deployment such as XDSL, FTTH, ISDN, GSM, GPRS, 3G, 4G, etc.

Another problem is the socio-economic situation of the users, as access to said aforementioned communication networks depends, in most cases, on subscription charges with different business models (fixed payment, pay-per-use, prepayment, etc.) which not all digital service users can assume. Among the socio-economic factors, users' age and education are conditioning factors since, due to lack of knowledge and feeling of difficulty in the use of new technologies, there are certain social groups that may be excluded from accessing these advanced digital services.

An additional problem is the complexity of accessing the enormous amount of information currently available and which makes it difficult to find the information that is really important or useful.

Furthermore, in recent years, the improvement in telecommunications services and the evident associated economic savings and resources, has given rise to many initiatives to achieve the development of so-called Smart Cities, understood as cities that propose investing in aspects such as energy infrastructures (electricity, gas, etc.), transport or communication technologies (electronics, Internet, Internet of Things, etc.) to promote better quality of life and a lasting and sustainable economic-environmental development. But most of these initiatives are encountering some or all of the aforementioned barriers. These initiatives, promoted mainly by public administrations, are sparking commercial interest in reaching end users. This access always depends on the end user and his or her willingness to or possibility of subscribing to the services offered.

Current conventional video intercom systems, generally composed of an installation of two-wire buses and distinguishing them from those incorporating IP technology, do not have an infrastructure which allows them to provide advanced digital services, as the installation bus, when it exists, allows a very limited flow of information and is restricted to the transmission of a number of basic commands or messages, since they are systems which, generally, by means of a non-polarised two-wire communications line, communicates with a plurality of home terminals having an intercom and/or image display monitor, to transmit audio, video and data over the communication line, such that they are capable of holding a conversation between two elements of the installation, transmitting two audio channels via said two wires (upstream audio and downstream audio), one video channel (normally upstream) and one data channel for system management. In this type of system, low-performance and low-cost elements can coexist (only audio communication) with other high-performance elements (audio and video communication) wherein the cost is not so limiting.

A separate case is that of video intercom systems having IP technology, which do allow this flow of high-performance information, including bandwidth, but its implementation is very limited due to the high deployment costs, as they do not work with the usually available cabling. For example, solutions with IP technology are usually implemented over more complex and expensive infrastructures such as:

Structured cabling (CAT-5), which requires specific cabling and distribution or switching elements (switches), entailing high costs, which do not allow the reuse of existing cabling based on simplified installation two-wire buses.

The use of PLC (Power Line Communications) modems is also known in IP-based video intercom systems. These modems use the power supply to convert it into a high-speed digital data transmission line and leverage the existing cabling but require the use of an expensive modem in each device; in addition, the number of nodes is very limited.

Lastly, another alternative for implementing these IP-based video intercom systems would be through Wi-Fi networks, which requires a Wi-Fi module per device, with the ensuing cost and added problem that the distances at which they can be accessed are limited.

Therefore, these types of solutions are mainly focused on single-user video intercom systems (home, office, etc.), where this system is combined with the existing IP network in the household and which is accessed over XDSL, optical fibre, coaxial cable, etc., and therefore cannot be extrapolated to multi-user or multi-dwelling solutions.

One of the main problems of conventional video intercom systems based on two-wire buses is the use of the communication channel.

There are alternatives which allow the use of the video intercom infrastructure or system to access multimedia services on video intercom monitors through the display of on-screen menus generated by means of images in an external device, but at the cost of occupying the communication channel, whereupon the video intercom and information service cannot be used simultaneously.

Patent ES-2170682-B1 relates to an installation of an audio door entry system and, additionally, video intercom, with bi-directional access to the telephone line, through any dual-tone multi-frequency telephone (DTMF), making it possible to communicate and/or open the door from any of them using the corresponding outdoor entry panel bi-directionally and enabling switching between different communications established, but that requires incorporating two additional wires to provide a video signal.

Patent application EP-1955486-A1 shows a video intercom system having multimedia functions with external information sources that reach the user via the two-wire bus infrastructures, but where it is limited to a single user who can access the service each time, or is limited to a local connection within the dwelling to a multimedia player, and also without using the infrastructure of the building of the video intercom system.

Document US-20120028589-A1 shows an interactive method and system for monitoring dwellings through facial recognition which includes communication with a multimedia content distribution network by means of a video intercom. Although the system of this document seems to show simultaneous access to advanced multimedia services to a plurality of users, the system disclosed does not allow its implementation through a two-wire bus infrastructure and, on the contrary, is supported by a specific element for managing multimedia content.

Furthermore, the most extended use in the connectivity of building installations is that of remote management of domotic systems and alarms, such as those shown in patent applications US-2013297259-A1 or US-2008279202-A1. In these applications, individual connectivity systems in each dwelling are used for remote management and do not actually use the video intercom installation infrastructure to perform said management and which, therefore, does not allow the simultaneous management of the audio and video intercoms of various dwellings, as in the case of an office or residential building.

There are devices that can be assimilated to the communications gateway concept presented in this invention to the extent that some of the components or modules are typical in these types of systems (such as for example a processor, a signal conversion or input and/output ports), but clearly have different functionalities or applications. For example, utility model CN-201215979-Y is directly aimed at a gateway in the form of a set-top-box or IPTV signal decoder having a wireless interface; or document CN-101977192, which discloses a gateway for medical applications and which enables the connection, on the one hand, of the devices or sensors of a user, mainly over Zigbee protocol and, on the other, provides IP connectivity.

There are other types of gateways more proximate to video intercom systems, such as that disclosed in document EP-2556629-A1, where the gateway enables, as opposed to the solution proposed in the present invention, the connection of end user devices such as PCs, tablets, mobile phones, etc. to the video intercom system to receive/send the audio and/or video signal of the video intercom system; therefore, they are not aimed at offering advanced digital services by accessing them through an Internet connection to a specific system that offers and manages said services.

Another significant example is patent application WO-2012066397-A1, which discloses a system that offers a video intercom service and additionally provides services accessible via the Internet, essentially for managing domestic sensors and where there is a gateway for said access. Said gateway is connected to the outdoor panel of the video intercom system and is in charge of routing the call towards the terminals of each dwelling, using for such purpose TCP/IP routing; therefore, all communication is over TCP/IP, both internal system communication and outgoing communication, towards the Internet. Therefore, said gateway is essential both for providing the video intercom service and for external access and implies a critical point for the entire system in the event of failure. This document shows the use of twisted pair as cabling, i.e. it is assimilated to a CAT-5 cable, and therefore the system is not adapted for operating with the wires of a traditional video intercom installation. The information shown by the terminals of the dwellings and accessibility to the external services is carried out through web pages managed by a web client in the terminal itself.

DESCRIPTION OF THE INVENTION

An alternative to the state of the art that covers the gaps found therein must be offered, particularly to ensure that digital services reach any audio or video building intercom installation, no matter how simple, using the existing installation buses, which at times are only two-wire buses and wherein the communication within said video intercom system does not require IP technology, which would raise installation costs.

To this end, the present invention provides a multi-channel video intercom system 600 with access to advanced digital services which comprises a two-wire communication bus 650 disposed such as to allow audio, video and data communications in different communication channels, at least one outdoor panel 630 with a camera connected to said communication bus 650, at least one power supply 640 connected to said communication bus 650 disposed to feed the rest of the video intercom system 600, at least one dwelling terminal 300 connected to said communication bus 650 wherein said at least one terminal 300 is connected to the at least one outdoor panel 630 and wherein the at least one terminal 300 is a video intercom terminal 310. As opposed to the known systems, the system of the invention characteristically comprises 600 a communications gateway 100 connected to said communication bus 650 through a first connection interface and with Internet connected 700 through a second connection interface wherein said gateway 100 is disposed such as to allow access to advanced digital services accessible via the Internet 700 from the at least one video intercom terminal 310 through at least one communication bus 650 channel when said at least one channel is available for data.

Therefore, as opposed to existing solutions, the present invention focuses on ensuring that digital services reach any audio or video building intercom installation, no matter how simple and to all the different dwellings of the installation, using the existing installation buses, mainly only two-wire buses and which therefore do not require TCP/IP infrastructure for communications within the video intercom system itself.

Embodiments of the system of the invention are described, according to the attached claims, and in a subsequent section.

The system compliant with the previously described aspects of the invention has a series of advantages with respect to the prior art, which can be summarized as follows:
  Access to digital services from a basic video intercom infrastructure is allowed, of the type usually installed in dwellings and other types of buildings.
  Therefore, the invention can function through a communication bus of the video intercom infrastructure that only requires two wires for the implementation thereof.
  Therefore, it significantly reduces the cost of the deployment that would be required to provide these types of digital services. Access thereto can be performed directly through a video intercom.
  Therefore, the invention does not require an internal TCP/IP network to communicate the different elements of the video intercom system and only the communications gateway implements it to connect to the Internet.
  It is a multi-user and/or multi-dwelling system, since it is designed to offer services for a group of different houses, not for a single dwelling.
  The cost of accessing the Internet is also reduced, since said costs are shared among all the neighbours and can even be subsidised by the service providers, due to the fact that there is only one common Internet access point through the communications gateway.

The users have access to the advanced services from their own house, customised and in accordance with the geographical conditions where the building is located.

These services are offered adapted to the type of user and to the type of terminal owned by said user, without need for significant deployments in the video intercom system nor in the terminals themselves.

Given that the invention, through the communications gateway, is connected to the Internet, an access is opened to a multitude of service providers, all without additional deployments in the video intercom infrastructure.

Despite accessing the Internet, access through the video intercom is performed securely with this solution, as all the information towards the Internet or from the Internet is encrypted.

These and other advantages are evident in light of the detailed description of the invention.

BRIEF DESCRIPTION OF THE DRAWINGS

The foregoing and other advantages and characteristics shall be more readily understood from the following detailed description of embodiments, with reference to the attached drawings, which must be considered by way of illustration and not limitation, wherein.

DETAILED DESCRIPTION OF THE INVENTION

The elements defined in this detailed description aim to provide an improved global understanding of the invention. Consequently, persons skilled in the art will recognise that variations and modifications of the embodiments described herein can be made without detracting from the scope and spirit of the invention. Also, the detailed description of sufficiently known functions and elements has been omitted for the sake of clarity and concision.

Naturally, the different functionalities of the invention may be implemented with different variations in architecture, protocols, devices or types of services and applications. Any implementation presented hereunder has been included for the purpose of illustrating and making the invention understandable and not with the intention of limiting aspects thereof.

Figure 1:
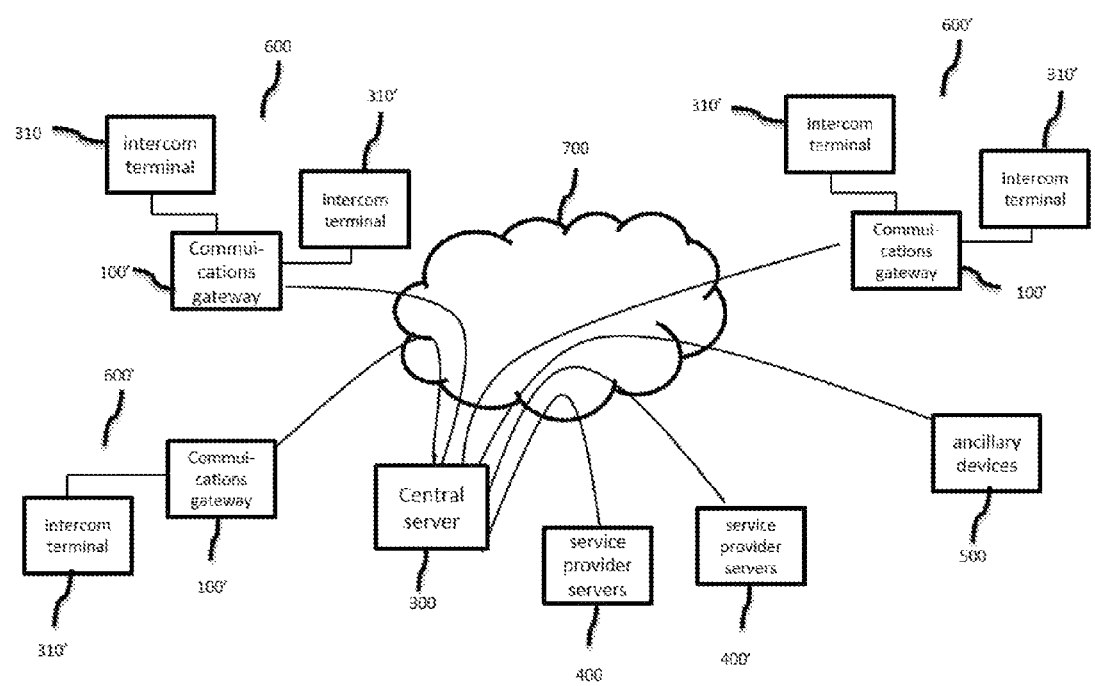
FIG. 1 shows a schematic view of the different elements that participate in the present invention and how they communicate there between and, particularly, the gateway 100, which allows connection between the video intercom system 600 and the Internet 700 and, therefore, access to the advanced digital services. Only those elements of the video intercom system 600 most involved in the provision of advanced services, on which the present invention focuses, are shown.
Figure 2:
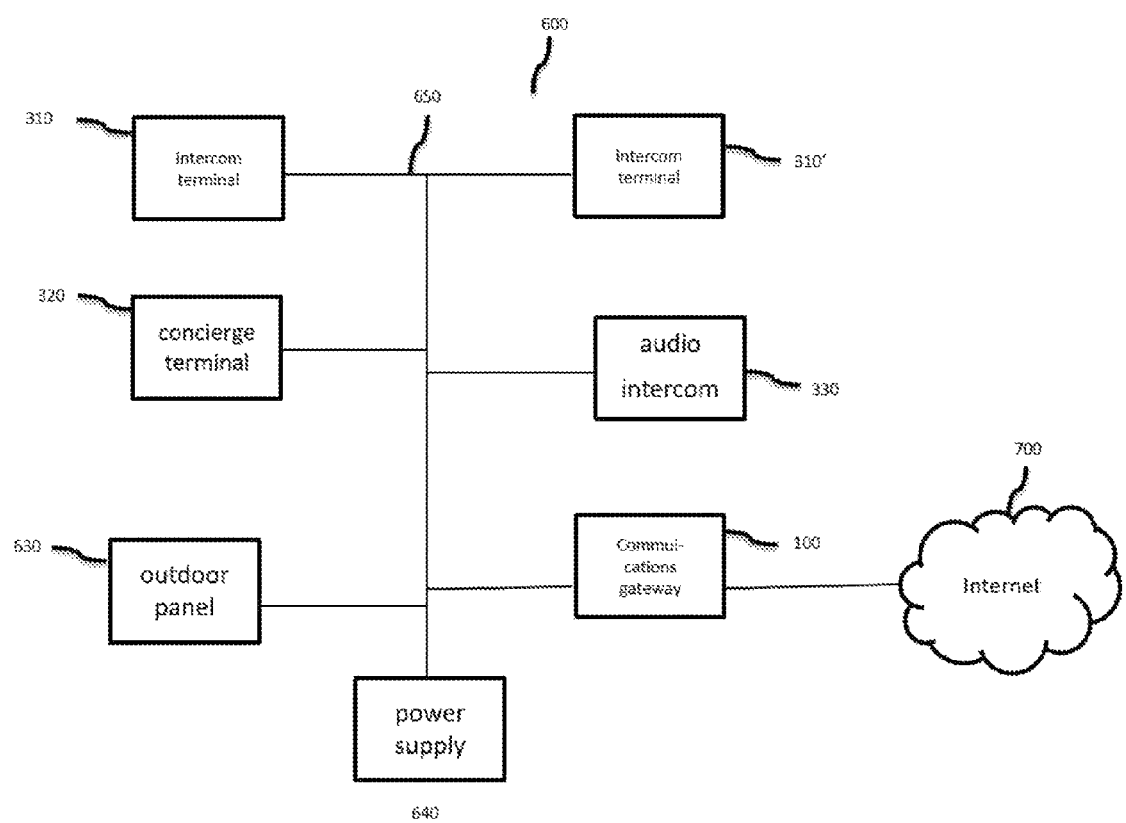
FIG. 2 shows a schematic view of the typical elements of a video intercom system 600 wherein the communications gateway 100, which allows access to advanced digital services, has been included in a particular and differentiated manner.

The present invention focuses on allowing the video monitors or terminals 310 of the video intercom system 600 to offer their users advanced digital services via the communications gateway 100, as can be observed in FIG. 1, where other external elements in charge of offering said services are also envisaged. Additionally, the elements of the video intercom system 600 are shown in greater detail in FIG. 2.

Therefore, the following elements are envisaged:

a) Video intercom or intelligent video intercom terminal 310. One or various may exist per each different dwelling. The system is designed both to function in a single dwelling and, preferable, in a group of dwellings, i.e. at least two different dwellings, such that the video intercom system 600 enables access to the advanced digital services from at least one video intercom terminal 310 of one of these dwellings. The terminal 310 has specific menus for accessing the different additional functionalities in addition to those inherent to the video intercom, namely:

Messages mailbox. Said mailbox stores all the messages sent by the service provider servers 400 or the central server 300 and which are received due to the connection with the gateway 100 that connects to the central server 300 and which, in turn, connects to the different service provider servers 400. The mailbox has functionalities to be able to read, answer or delete them and to confirm proposed actions such as the installation of applications or the addition of a service provider in the agenda.

Services agenda. It contains a list of the services offered by the providers from their service provider servers 400 which have been added through the communication gateway 100 and the central server 300. The agenda shall preferably contain a list of the services offered by the service providers near the dwelling or building which will be added on acceptance by the video intercom user of an option in a received message.

In order to identify the services based on proximity, the location or site of the communication gateway 100 known by the central server 300 is taken into account when registering the gateway 100 in the server 300, as described below.

Some services on the agenda may be previously preconfigured, as in the case of the service provided by the building administrator or video intercom system 600 maintenance service.

List of available applications. This list shows the user, on the video intercom terminal 310, the available applications that can be installed on the terminal 310 and the use of each, indicating whether they are free or payable. On accepting the installation of an application, it is downloaded from the corresponding service provider server 400 through the communications gateway 100 and the central server 300 and is installed on said terminal 310.

Each service is identified by a unique code in order to make reference thereto during the exchange of information with the service provider server 400 through the communications gateway 100 and the central server 300.

Applications. Applications already downloaded and installed on the video intercom terminal 310 and which enable access to specific services offered by the service provider servers 400. These applications can be periodically updated automatically.

Each application is identified by a unique code in order to make reference thereto during information exchange with the service provider's server 400 via the communications gateway 100 and with the central server 300.

Registration of ancillary devices. It allows the registration of personal or ancillary devices (500), with Internet connection capacity (700) and therefore with the capacity to be configured for connection to the central server (300) and to access the same services which are accessed from the video intercom terminal (310). In a non-limiting manner, examples of these types of ancillary terminals (500) would be, but not limited to: smartphones, tablets, personal computers, etc. In the event of registering an ancillary device (500) in the video intercom terminal 310, the address of the ancillary device 500 is stored in the video intercom terminal 310.

Each video intercom terminal 310 has a unique identifier inside the video intercom system 600 which makes it possible to route its information both outwards via the communications gateway 100 and towards the video intercom terminal 310 from that coming from the central server 300. Said identifier is not an IP address and can be implemented in a preferred embodiment through a six-digit code, wherein a different code will be assigned to each of the terminals 310 connected to the video intercom system 600.

In addition, the video intercom terminal 310 has a set of capabilities such as, for example, but not limited to, screen type and resolution, memory, touch screen, etc. This information is maintained by the terminal itself in the form of data and is communicated to the gateway 100 when the video intercom system 600 is connected and, in turn, can communicate with the central server 300, such that the necessary information for providing the advanced digital services can be adapted in accordance with said capabilities. For example, top-of-the-range terminals 310 having the best capabilities may request full information from the communications gateway 100 and store it in the terminal itself 310 ready when the user is going to use it and, in turn, terminals 310 with more limited memory capabilities must request the information as the user requires it.

The video intercom terminal 310 stores the gateway address 100 in order to route all the necessary information for providing the advanced services towards it.

The services are offered to the user by means of a message received or by means of the publication of available applications, generally by broadcasting, i.e. of messages received simultaneously to a set of video intercom terminals 310. The user can subscribe to the services from the video intercom terminal 310 by confirming an option in the message received or on requesting the installation of the application. Once subscribed to the service, it can be accessed by means of the services agenda or by means of the application installed. In some cases, the user must provide private information (name, address, etc.) to the service provider in order to be offered the services.

The video intercom terminal 310 has a user interface which can be more or less user-friendly in accordance with the type of terminal and its capabilities. The simplest terminal contains the screen and a few multi-use navigation push-buttons. The most complex includes a touch screen on which to select the different options. The different services are available and adapted in accordance with the possibilities of the user interface.

Optionally, the video intercom terminal 310 may have some means of secure user identification means such as a digital fingerprint reader, RFID Card reader or voice recognition, to sign or certify acknowledgements of message delivery or to perform secure transactions, including purchases of products or services through the digital services accessible from the video intercom terminal 310.

b) Communication bus 650. The different elements that form the multi-channel video intercom system 600 are usually interconnected through a communication bus 650.

Particularly in this invention, the communication bus 650 of the multi-channel video intercom allows the simultaneous transmission of the audio and video intercom signals and of the advanced digital services. And more specifically, the preferred embodiment of said multi-channel communication bus 650 in this invention is that provided by a video intercom system such as that described in the patent application published as EP-2824917-A1 and US-20150009283-A1.

The infrastructure disclosed in this application, EP-2824917-A1 allows at least two simultaneous audio and video conversation channels between the outdoor panels and dwelling or building terminals. In idle mode, all the available bandwidth (all the channels) can be used to provide the advanced digital services to the dwellings or buildings at maximum speed. If a video intercom conversation is established, at least one conversation channel is available to provide the advanced digital services. Said bus is non-polarised bus and wherein channel separation is performed by time division multiplexing (TDM).

The preferred implementation would be including two types of modulators and demodulators in the same frequency band: on the one hand, a digital BNFSK (Binary Narrow Frequency Shift Keying) modulator and demodulator for transmitting audio and data and by another digital PPM (Pulse Position Modulation) modulator and demodulator for audio and video transmission and, in the case of communication via a communications gateway 100, also for the burst-mode data transmission, as it allows a higher data speed than that provided by BNFSK modulation.

Both the video intercom terminals 310 and the outdoor panels 630 and communications gateway 100 incorporate these modulators and demodulators to support the audio, video and data channels. Audio intercoms 330 only require a BNFSK modulator/demodulator since they do not receive video.

What is important about this bus 650 is that it only requires two wires for its implementation, due to which any existing porter or video intercom infrastructure in the building can be leveraged.

c) Communications gateway 100. It is the element that connects the installation or video intercom system 600 to the Internet 700 and, more specifically, to at least one central server 300.

In particular, the communications gateway 100 is comprised at least of:

A first interface that connects to the rest of the video intercom system; wherein said connection is performed through the communication bus 650. Said connection interface enables communication with the infrastructure or video intercom system and therefore sends or receives information from the video intercom terminal or terminals 310 connected to the same communications bus 650.

A second Internet connection interface, wherein said connection to the Internet can be performed via a telecommunications network which can be Ethernet or wireless in accordance with standards 2G/3G/4G or WI-FI or any other connection capable of connecting to the Ethernet 700. Through this interface, the communications gateway 100 sends and receives the information related to the provision of the digital services of the central server 300 to which it is connected.

The communications gateway 100 has an IP address which enables communication via said Internet connection interface and, more specifically, with the central server 300. In particular, when information is exchanged between the gateway 100 and the central server 300 related with a video intercom terminal 310, said information is jointly identified with the gateway IP address and the terminal address or code, such that the central server 300 and service provider server 400 can properly manage said information of said terminal and, therefore, of the user of said video intercom terminal 310.

A processor, microprocessor or microcontroller, capable of running computer programs, wherein said processor is in charge of at least the following tasks:

Monitoring the activity of the first connection interface with the rest of the video intercom system 600 to see when a communications channel is available and updating the information in the video intercom terminals 310. In particular, the update can be performed by sending a notification so that the information can be sent to the user upon request or sending all the information so that it is stored in the video intercom terminals 310. Likewise, the information can be distributed by broadcasting to all the terminals 310 or a group thereof.

Performing the translation of the information between the Internet connection interface and the connection interface with the video intercom system. This translation consists both of translation between protocols, such as routing, on not using routing and TCP/IP protocol within the multi-channel video intercom system 600.

Optionally, it controls the performance of automatic tests of different elements of the video intercom system 600 and mainly of the video intercom terminals 310.

A non-volatile memory for storing permanent data, such as the addresses of the communications gateway 100 itself, the video intercom terminals 310 or the central server 300.

A volatile memory module for storing temporary data

A power supply for supplying electricity to the gateway 100.

An encryption/decryption module. All the service-related information received or sent via the Internet connection interface is treated in this encryption/decryption module before being processed by the processor. The encryption, of a preferred embodiment, can be processed using SSL or TLS at transport layer level. Optionally, the communication platform 100 can be configured to establish a virtual private network (VPN) with the central server 300.

Optionally, said communications gateway may include at least one USB port, a galvanic isolator or status indicators including, at least, those relating to power supply, activity in the connection interface with the video intercom system bus and activity in the Internet connection interface.

The communications gateway 100 has means for obtaining its geographic position and communicating it to the central services server 300 through the Internet connection interface on registering said central server 300 for the first time. Said means may be a GPS module, software and/or hardware in charge of obtaining the position by triangulating the mobile network repeaters or using the IP address of the gateway or communications router whereto the communications gateway 100 may be connected as a reference.

d) Other elements of the multi-channel video intercom system 600. In addition to the video intercom terminals 310, the communication bus 650 or communications gateway 100, this video intercom system 600 may have other usual elements in a video intercom system, as can be observed in FIG. 2.

Said elements that form said video intercom system include the outdoor panels 630, which allow communication with the users of the dwellings from outside the building and building entrance and which, in the case of this invention, generally include a camera in order to see the person calling in the video intercom terminal.

In addition, they also include the power supplies 640 that provide current intensity required for the operation of the rest of the video intercom system components 600.

Among the different types of terminals that can exist in a video intercom system, in the case of this invention the focus is on the video intercom terminals or monitors 310, as they have the minimum capabilities to allow access to the digital services (processing, memory, screen, etc.). But the multi-channel video intercom system 600 also allows the use of other types of terminals, such as the terminals installed in building porter's offices 320, which may have similar capabilities to the users' video intercom terminals 310 or audio intercoms 330 with the sole capability of communicating via audio with the outdoor panels 640.

e) Central services server 300. It is an element that forms part as such of the video intercom system 600, is accessible via the Internet 700 and mainly performs the following functions:

Maintains the list of communications gateways 100 with connection with said central server 300 and their characteristics, mainly their IP address.

Maintains a list with the relevant information of each of the video intercom terminals 310 belonging to the video intercom system 600 whereto a communications gateway 100 is connected. In particular, this information includes at least the video intercom terminal 310 identifier and its capabilities. Optionally, information on the operating status of said video intercom terminal 310, type of hardware, firmware installed or its operating status (proper functioning, malfunction, etc.) is kept.

Optionally, information is maintained for accessing certain services of the registered users and associated with each of the video intercom terminals 310.

Optionally, it maintains a virtual representation of each video intercom installation 600 with detailed information of the services provided to each video intercom terminal 310, the applications installed and their versions. In this manner, the service providers, through the service provider servers 400 that access the central server 300, have access to installation details: the maintenance manager views the status of the installation and can provide a rapid diagnosis. If a video intercom terminal 310 malfunctions, it can be replaced by another and it is configured with all the information and services of the former terminal. The applications can be maintained updated when new versions appear. The information sent by the service providers to the dwellings and buildings, which must receive it through the video intercom terminals 310, is filtered.

Maintains the list of service providers, their service provider servers 400, the services they present and to which video intercom installation 310 and dwelling they provide them.

Provides the messaging service, as server, between the service provider servers 400 and the video intercom terminals 310. In a preferred embodiment of implementation of said messaging service, the central server 300 houses a messaging server that is used to exchange messaging service messages with the communications gateways 100.

Provides the development environment of the applications to the service providers.

Stores the user applications in order to download them to the video intercom terminals 310 when a user requests them from its terminal or an existing application must be updated.

Performs communication between the service providers' applications through their service provider servers 400 and the communications gateways 100 of the video intercom 600 installations and communications gateways 100 of the video intercom 600 installations in a secure manner, encrypting and/or unencrypting the information.

In a preferred embodiment, the server is composed of the different layers inherent to a cloud service such as the Hardware as a Service (HaaS) layer, the Platform as a Service (PaaS) layer and the Software as a Service (SaaS) layer.

Access to the service providers is structured on the PaaS layer at the same time as the application development tools or SDK.

The SaaS layer gives support to the applications to which users have access and which are available for updating and downloading.

The communications gateways 100 of the buildings act as temporary caches of the information exchanged between the applications and the SaaS layer.

Optionally, in another embodiment, the central services server 300 is backed up by another redundant backup server containing the same information as the original server and starts up if the first server crashes.

f) Service provider servers 400. They are the elements responsible for attending the user request received by means of the applications installed in the video intercom terminals 301 and manage the information sent to said terminals. All communications towards the terminals 310 are always routed through the central server 300, which validates the transfer, and from there to the communications gateways 100 of the video intercom installations or systems 600. Normally, these servers 400 form part of the service provider infrastructure and the preferred communication mode with the central server 300 is via the Internet 700 and using secure protocols such as for example SSL or TSL.

Non-limiting examples of service provider services can be that used for the maintenance service to diagnose the status of a video intercom system 600 or that used by the local public authorities to send communications to residents. Other examples include those which manage purchase orders or send advertisements to dwellings or buildings.

g) Associated ancillary devices 500. They are personal user devices such as smartphones, tablets and computers, which can be associated with a video intercom terminal 310 in order to access the same services as said terminal.

Communication between the central services server 300 and the ancillary device 500 is performed directly via the Internet 700 without need to connect to the communications gateway 100 of the building, whereby the same digital services are enjoyed ubiquitously by users regardless of their location.

Following are some illustrative and non-limiting examples of different operating modes and functionalities of the described invention.

Offering advanced digital services in a video intercom installation or system 600 requires the installation of a communications gateway 100 such as that described in this invention and connecting it to the Internet 700.

Therefore, the presence of this communications gateway 100, characteristically, differentiates a video intercom installation that offers advanced services from a traditional installation that only offers video intercom service.

The installation of the gateway is non-intrusive and is executed parallel to the installation, connecting to the communication bus 650 of the video intercom system as another element, so that if it fails, the video intercom system continues functioning normally with respect to typical video intercom functionality except, naturally, for providing the advanced digital services.

The communications gateway 100, on functioning for the first time, tracks all the elements of the video intercom installation 600 (video intercom terminals 310, intercoms 330, outdoor panels 630, concierge 320) and it is registered on the central server 300, to which it communicates this information, the IP address of the gateway itself 100 and its geographical position obtained, in the preferred embodiment, by triangulating the nearby mobile telephony repeaters. Once registered, the central server 300 publishes its existence to the service provider servers 400 so that the service providers can offer them. The installer can provide additional information about the postal address of the installation via the Internet 700 or about a telephone call to the support centre to add it to the central server.

The service provider servers 400 send messages offering their services and information about the available applications to the video intercom terminals 310 and, if any, to the ancillary devices 500 associated with or registered through the central server 300.

The central server 300 is in charge of filtering the information, transmitting only that which is permitted to each user and/or following geographical criteria according to the location of each communications gateway 100. For example, if various service provider servers 400 have the same service, information can only be received from the service provider server 400, whose provider is identified as being that nearest the user.

When a user video intercom terminal 310 receives a message, in accordance with its nature, it can receive additional information through the video intercom terminal 310, confirm the receipt or install the service offered as an entry in the services agenda or a new application. These requests are sent through the communications gateway 100 to the central server 300, which will be in charge of retransmitting it to the corresponding service provider server 400.

The acceptance of the service may require users to identify themselves through personal information (name, address, payment method, credentials, etc.) and secure transmission to the central server 300 is important, therefore all communications between the communications gateway 100 and the central server 300 are encrypted and decrypted through the encryption/decryption module of the communications gateway 100.

An example of this type of services that requires personal information are the technical support services, which require the user's address in order to attend requests. Those services that do not require this information treat users anonymously, i.e. personal user information is not sent to the service provider server 400.

In turn, the user, through the services agenda, can request information or communicate any incident via the messaging service. The message is sent to the communications gateway 100, which then sends it to the central services server 300 so that it will send it to the corresponding service provider server 400 or, alternatively, send an email to the service provider.

The applications installed in the video intercom terminal 310 are in charge of maintaining the information offered to the user updated, connecting to the central server 300 periodically through the communications gateway 100 or when they receive a notification from said central server 300 when new information is available.

An example of such applications could be home food delivery requests wherein the list of available products and prices are displayed in the video intercom terminal 310. When the user requests the service through the application installed on the video intercom terminal 310, said application is in charge of sending the request to the central server 300 and from there forwarding said request to the corresponding service provider server 400 for processing by the service provider.

As mentioned earlier, the advanced digital services which can be given access from the video intercom terminal 310 are restricted to the geographical area thereof, taking the geographical location of the communication platform 100 as a reference.

For example, a communication channel can be implemented between the neighbours and the building administrator so that it can transmit relevant communications: meetings, issuance of monthly debits, special apportionments or communications by neighbours of anomalies in the installations for repairs. Other channels that can be implemented are neighbourhood services, wherein local traders offer their products and services, with the possibility of making a purchase or requesting a repair through the video intercom 310.

The local administration can also implement an advanced service for citizens wherein information about the activities of the neighbourhood or municipality is provided, with the payment due date and amount of the municipal taxes. Likewise, citizens also have a channel for communicating with the administration to clarify any doubts.

Therefore, in a general but non-limiting manner, the advanced digital services can fall under one of the following categories:

Messaging. These types of services are characterised in that they include, among others, functionalities such as:
Service provision. A service provider having a service provider server 400 connected to the server 300 can offer its advanced services to one or various video intercom terminals 310. The service provider server 400 sends the service code, the service provider identifier, a geographical zone of interest for the provision of the service (postcode, building, address, etc.) and a message to be transmitted. The central services server is in charge, based on the information received, of identifying the communications gateway(s) 100 and the video intercom terminals 310 to which said message may be addressed and communicates the message to the communications gateway(s) 100. The gateway decrypts the message and sends it to the video intercom terminals 310 to which it has already routed said message, together with the service code. Each video intercom terminal 310 receives the message.

Service acceptance. When a message is received offering a service in a video intercom terminal, 310, the user can accept said service from the terminal itself. In addition to the acceptance, it may be necessary to introduce personal user information (credentials, address, etc.). The acceptance and personal information is sent via the gateway 100 to the central services server 300, which registers the service as a service assigned to said terminal 310 and user and also sends the information to the service provider service 400 that will include the user in its list of recipients of such services. The video intercom terminal 310, for its part, will include the service in the available services agenda.

New service provider message. As a consequence of the service provision by a service provider, it can send new messages via the service provider server 400. Said server sends the information that identifies the user, the message and the confirmation request, if required, to the central services server 300. The central server 300 verifies that it is a message of a permitted service and identifies the video intercom terminal 310 whereto the information is addressed and is sent to the communications gateway 100 whereto said video intercom terminal is connected 100. When the message reaches the communications gateway 100, said gateway verifies the capabilities of the video intercom terminal 310 whereto said message is addressed. If the video intercom terminal 310 does not have the capacity to receive all the information, the communications gateway 100 only sends an alert to the video intercom terminal 310 indicating the availability of the message and, when the user requires it and there is an available communication channel in the communication bus 650, the rest of the information will be sent which will be stored, cached, until then on the communication platform 100.

Remittance of a message to a provider or service provider. When the user of a video intercom terminal 310 wants to communicate a message to a service provider selects the service in services agenda of the video intercom terminal 310, writes the message and indicates its remittance. The communications gateway 100 receives the message, the code of the service whereto it is addressed and the identifier of the video intercom terminal 310. The gateway 100 includes its address and, after encrypting the request, it is sent to the central services server 300. The central server 300 identifies the user based on the identifier of the video intercom terminal 310 and of the gateway 100 and sends the message to the service provider server 400 in charge of the indicated service.

Reading of a message with acknowledgement of receipt. When a video intercom terminal 310 receives a message that requires confirmation by the user of said terminal 310, the user selects the confirmation of said message in the terminal, which includes the identifier of the terminal 310, the service code and the code of the message to be confirmed and is sent to the communications gateway 100, from there to the central services server 300 together with the address of the gateway and, finally, confirmation is sent to the service provider server 400 corresponding to said service.

Reading of a message with signed acknowledgement of receipt. In the case of confirmation of the message by a user who requires the electronic signature of the user or the introduction of his or her credentials, in addition to the previously explained method, the step of requesting the user's signature through the terminal 310 is added. Said signature can consist of a biometry request (digital fingerprint, iris reading, voice recognition, etc.), the use of a RFID Identity Card through an RFID reader or of any other type of obtainment of credentials which allow secure verification of the user's identity. The central services server 300 is in charge of verifying that the signature or credentials supplied are correct.

Some examples of this type of messaging services are included below in an illustrative and non-limiting manner:

Public authorities. Sundry communications (payment of bills, public events of interest, public tenders, . . . ). Access to the taxpayer's mailbox.

Advertising of miscellaneous products. Request for more information.

Building administrator. Sundry notifications, meetings, notices. Acknowledgement of receipt of notifications. Notification of malfunction of building elements (lights, lift, etc.).

Dwelling lessor. Lessor-lessee communications.

Technical support services. Request for repair services: electricity, plumbing, paint, home appliances, locksmiths, etc.

Equipment maintenance. Some examples of this type of equipment maintenance services are included below in an illustrative and non-limiting manner:

Preventive maintenance. The communication gateway 100 is disposed such as to launch a periodic check of the video intercom system 600 elements and mainly of the video intercom terminals 310 and, in the event of detecting any anomaly in response to the test, it is communicated through the central services server 300 to the service provider server 400 in charge of maintaining the video intercom system 600. Said communication includes the video intercom terminal 310 identifier or affected element and the IP address of the communication platform 100.

Remote installation test. The maintenance service provider, through its service provider server 400, can check the status of each of the elements of the installation or video intercom system 600, performing a diagnosis to determine if the problem must be solved in situ or it can be solved remotely. Each test launched from the service provider server 400 is accompanied by the communication gateway address 100 and the identifier of the video intercom terminal 310 or element of the communication system to be verified. Once the test is launched, the response is communicated to the maintenance service provider 400.

Equipment update. The firmware of the elements can be configured and updated remotely in order to resolve malfunctions or provide new features. When the service provider verifies the existence of a version or functionality available for a video intercom element or terminal 310, it sends said information through its service provider server 600 and central services server 300 to the gateway 100 and from there reaches the video intercom terminal 310 or corresponding element of the video intercom installation or system 650.

Applications. The video intercom terminals 310 can house applications that provide new customised services. The functions offered in relation to the applications include, inter alia:

Publication of applications: A service provider having a service provider server 400 connected to the server can offer its advanced services in the form of applications in one or more video intercom terminals 310. The service provider server 400 sends the application code, the identifier as service provider, a geographical zone of interest for the service provision (postcode, building, address, etc.) and a description of the application. The central service server 300 is in charge, based on the information received, of identifying the communication gateway 100 and video intercom terminals 310 whereto said information can be routed over said application and the information communicated to the communication gateway 100. The gateway 100 decrypts the message and sends it to the video intercom terminals 310 whereto said information is addressed, together with the application code. Each video intercom terminal 310 receives the information.

Acceptance of an application. When a video intercom terminal user wishes to accept an application from a service provider, their personal information is requested through the video intercom terminal 310 and the acceptance and said personal information is sent to the service provider server 400 through the communication platform 100 and the central server 300. The service provider server 400 registers the user as the recipient of said application and, therefore, of said service and the central server 300 sends the application for installation to the video intercom terminal 310 through the communication gateway 100 together with the application code. The download of applications is performed in a preferred and non-limiting manner over FTP (File Transfer Protocol). Lastly, the video intercom terminal 310 includes the application on the list of applications and on the menu of applications accessible from said terminal.

Information for applications. As a consequence of the provision of the service accessed through an application by a service provider, said provider can send information through the service provider server 400. Said server sends the information related to said application and user identification to the central server 300, the central server 300 checks that said user has installed said application and, if so, sends the information to the video intercom terminal 310 over the communication platform 100.

Requesting information from an application. An application installed on a video intercom terminal 310 can send an additional request for information to the service provider. To this end, the request for information from said terminal together with the application code and terminal identifier 310 is sent to the service provider 400 to which said application belongs through the central server 300 and sends the information requested as in the previous case.

Purchase of an article from an application. A user, from his or her video intercom terminal 310, can request the acquisition of a product or service offered by the service provider. To this end, the user confirms the purchase from the application in the video intercom terminal 310. Said confirmation may optionally include the user signature or a PIN or personal code. The code of the requested article, the application code and the terminal application identifier 310 are sent to the central server through the communication platform 100. The central services server 300 sends the article and application codes together with the user identification to the service provider server 400 for the user to provide the article.

Some examples of applications that can be offered through the video intercom terminals 310 of the users are shown below by way of illustration and not limitation:

Online purchases: home food delivery, supermarket, etc.

Information: weather, news, traffic, household consumption (water, electricity, gas, with historical reports), etc.

The invention claimed is:

1. A multi-channel video intercom system with access to advanced digital services which comprises a two-wire communication bus disposed such as to allow at least two simultaneous audio, video and data conversations in separate communication channels, at least one outdoor intercom panel having a camera connected to said communication bus, at least one power supply connected to said communication bus disposed to provide power to the rest of the video intercom system, at least one user terminal connected to said communication bus wherein said at least one terminal is connected to the at least one outdoor panel and wherein at least said terminal is a video intercom terminal, wherein said video intercom system comprises a communications gateway connected to said communication bus through a first connection interface and connected to the Internet through a second connection interface, wherein said gateway is disposed such as to allow access to advanced digital services accessible via the Internet, registration to said services, from the at least one video intercom terminal through the at least one bus communication channel when said at least one channel is available for data.

2. The multi-channel video intercom system, according to claim 1, wherein said communications gateway monitors the activity of said first connection interface and, upon detecting the existence of at least one available data channel in said communication bus, it performs the update related with the access to said advanced digital services in the at least one video intercom terminal.

3. The multi-channel video intercom system, according to claim 1, wherein said two-wire communication bus is a non-polarised bus and wherein the separate communication channels are obtained by time division multiplexing (TDM).

4. The multi-channel video intercom system, according to claim 1, comprising at least two user terminals and at least one outdoor panel connected to said communication bus, wherein said terminals are connected from said at least one outdoor panel independently to maintain individual conversations.

5. The multi-channel video intercom system, according to claim 1, wherein the at least one Internet connection interface of said communications gateway may be an Ethernet interface over XDSL, optical fibre or coaxial cable, a Wi-Fi interface or an interface with a 2G, 3G or 4G mobile network.

6. The multi-channel video intercom system, according to claim 1, wherein said advanced digital services are accessed via the Internet connection of said communications gateway to a central services server whereto at least one service provider is connected.

7. The multi-channel video intercom system, according to claim 6, wherein the advanced digital services which are accessed are at least one of the maintenance services of the video intercom system, messaging services or application services accessed by at least one application installed in the at least one video intercom terminal.

8. The multi-channel video intercom system, according to claim 6, wherein said communications gateway is disposed such as to offer information cache functions between at least one central services server and the at least one video intercom terminal.

9. The multi-channel video intercom system, according to claim 6, wherein said communications gateway communicates its geographical position to the at least one central services server and this information is used by the at least one advanced digital services provider server to offer services related to said geographical position.

10. The multi-channel video intercom system, according to claim 1, wherein said communications gateway is disposed so as to encrypt the information that goes towards the Internet via said second connection interface and decrypt the information coming via said second connection interface.

11. The multi-channel video intercom system, according to claim 1, wherein said video intercom terminal provides access to a registration service to an Internet-connected ancillary device associated with said video intercom terminal such that all the services accessed through the communications gateway via said video intercom terminal can be accessed by said Internet-connected ancillary device connecting directly through the Internet to the central services server.

12. The multi-channel video intercom system, according to claim 7, wherein said communications gateway communicates its geographical position to the at least one central services server and this information is used by the at least one advanced digital services provider server to offer services related to said geographical position.

13. The multi-channel video intercom system, according to claim 8, wherein said communications gateway communicates its geographical position to the at least one central services server and this information is used by the at least one advanced digital services provider server to offer services related to said geographical position.

* * * * *